(12) United States Patent
Zheng et al.

(10) Patent No.: US 8,787,304 B2
(45) Date of Patent: Jul. 22, 2014

(54) METHOD FOR REFERENCE SIGNAL PATTERN ALLOCATION AND RELATED COMMUNICATION DEVICE

(75) Inventors: Yan-Xiu Zheng, New Taipei (TW); Chung-Lien Ho, New Taipei (TW)

(73) Assignee: Acer Incorporated, Xizhi Dist., New Taipei (TW)

( * ) Notice: Subject to any disclaimer, the term of this patent is extended or adjusted under 35 U.S.C. 154(b) by 505 days.

(21) Appl. No.: 13/163,735

(22) Filed: Jun. 20, 2011

(65) Prior Publication Data

US 2011/0310838 A1 Dec. 22, 2011

Related U.S. Application Data

(60) Provisional application No. 61/357,191, filed on Jun. 22, 2010, provisional application No. 61/359,652, filed on Jun. 29, 2010.

(51) Int. Cl.
*H04W 4/00* (2009.01)

(52) U.S. Cl.
USPC .......................................... 370/330; 370/329

(58) Field of Classification Search
None
See application file for complete search history.

(56) References Cited

U.S. PATENT DOCUMENTS

| | | | |
|---|---|---|---|
| 2009/0046646 A1 | 2/2009 | Cho | |
| 2010/0322179 A1* | 12/2010 | Yu et al. | 370/329 |
| 2011/0038344 A1* | 2/2011 | Chmiel et al. | 370/330 |
| 2011/0103292 A1* | 5/2011 | Pasad et al. | 370/315 |
| 2011/0103324 A1* | 5/2011 | Nam et al. | 370/329 |
| 2011/0111781 A1* | 5/2011 | Chen et al. | 455/507 |
| 2011/0200135 A1* | 8/2011 | Sorrentino et al. | 375/295 |
| 2011/0218004 A1* | 9/2011 | Catovic et al. | 455/509 |
| 2011/0243066 A1* | 10/2011 | Nayeb Nazar et al. | 370/328 |
| 2011/0252139 A1* | 10/2011 | Bhattad et al. | 709/226 |
| 2011/0268102 A1* | 11/2011 | Zhu et al. | 370/345 |
| 2011/0280201 A1* | 11/2011 | Luo et al. | 370/329 |
| 2011/0280333 A1* | 11/2011 | Yang et al. | 375/295 |
| 2012/0076106 A1* | 3/2012 | Bhattad et al. | 370/330 |
| 2012/0082119 A1* | 4/2012 | Chung et al. | 370/329 |
| 2012/0113909 A1* | 5/2012 | Jen | 370/329 |
| 2012/0120924 A1* | 5/2012 | Montojo et al. | 370/336 |
| 2012/0176885 A1* | 7/2012 | Lee et al. | 370/209 |
| 2012/0201187 A1* | 8/2012 | Koo et al. | 370/312 |
| 2012/0213147 A1* | 8/2012 | Noh et al. | 370/315 |
| 2013/0136071 A1* | 5/2013 | Han et al. | 370/329 |
| 2013/0195034 A1* | 8/2013 | Noh et al. | 370/329 |
| 2013/0230000 A1* | 9/2013 | Wang et al. | 370/329 |
| 2013/0286880 A1* | 10/2013 | Lee et al. | 370/252 |

FOREIGN PATENT DOCUMENTS

| | | | |
|---|---|---|---|
| EP | 2 056 515 A1 | 5/2009 | |
| WO | 2012071721 A1 | 6/2012 | |

OTHER PUBLICATIONS

Huawei, OCC mapping scheme for downlink DMRS, 3GPP TSG RAN WG1 meeting #61, R1-103098, May 10-14, 2010, XP050420174, Montreal, Canada.

(Continued)

*Primary Examiner* — Phirin Sam
(74) *Attorney, Agent, or Firm* — Winston Hsu; Scott Margo

(57) ABSTRACT

A method for reference signal pattern allocation for a eNodeB in a wireless communication system is disclosed. The method comprises allocating a plurality of physical resource blocks (PRBs) to at least one mobile device; and mapping a plurality of reference signal patterns to the PRBs according to a mapping rule.

72 Claims, 22 Drawing Sheets

(56) References Cited

OTHER PUBLICATIONS

Nokia Siemens Networks, Nokia, Considerations on Initialization and Mapping of DM-RS Sequence, 3GPP TSG RAN WG1 #58bis Meeting, R1-093890, Oct. 12-16, 2009, XP050388394, Miyazaki, Japan.

Motohiro Tanno, Yoshihisa Kishiyama, Nobuhiko Miki, Kenichi Higuchi, and Mamoru Sawahashi, "Evolved Utra-Physical Layer Overview", 2007 IEEE.

Samsung, "Discussion on DMRS OCC Sequence Mapping across OFDM symbols", 3GPP TSG RAN WG1 #60bis, R1-102189, Apr. 12-16, 2010, Beijing, China, p. 1-8.

\* cited by examiner

| | | | | |
|---|---|---|---|---|
| (a) | ABAB | ABAB | ABAB | ABAB |
| (a') | ABAB | BABA | ABAB | BABA |

For NPRB = 4

| | | | |
|---|---|---|---|
| (b) | ABA | BAB | AB | AB |
| (b') | ABA | BAB | AB | BA |

For NPRB = 2 and 3

| | | | |
|---|---|---|---|
| (c) | ABA | BA | BAB | AB |
| (c') | ABA | BA | BAB | AB |

For NPRB = 2 and 3

| | | | |
|---|---|---|---|
| (d) | ABAB | ABAB | AB | AB |
| (d') | ABAB | BABA | AB | BA |

For NPRB = 2 and 4

| | | | |
|---|---|---|---|
| (e) | ABAB | AB | ABAB | AB |
| (e') | ABAB | AB | BABA | BA |

For NPRB = 2 and 4

FIG. 16

For NPRB = 4
(a) ABABXABABXABAB
(a') ABABXBABAXABXBABA

For NPRB = 2 and 3
(b) ABAXBABXABXAB
(b') ABAXBABXABXBA

For NPRB = 2 and 3
(c) ABAXBAXBABXAB
(c') ABAXBAXBABXAB

For NPRB = 2 and 4
(d) ABABXABABXAB
(d') ABABXBABAXABXBA

For NPRB = 2 and 4
(e) ABABXABABXAB
(e') ABABXABXBABAXBA

FIG. 18

METHOD FOR REFERENCE SIGNAL PATTERN ALLOCATION AND RELATED COMMUNICATION DEVICE

CROSS REFERENCE TO RELATED APPLICATIONS

This application claims the benefit of U.S. Provisional Application No. 61/357,191 filed on Jun. 22, 2010 and U.S. Provisional Application No. 61/359,652 filed on Jun. 29, 2010 the contents of which are incorporated herein.

BACKGROUND OF THE INVENTION

1. Field of the Invention

The application relates to a method and a related communication device used in a wireless communication system and related communication device, and more particularly, to a method for reference signal pattern allocation and a related communication device in a wireless communication system.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNodeBs) and communicates with a plurality of mobile stations, also referred as user equipments (UEs).

A long term evolution-advanced (LTE-A) system, as its name implies, is an evolution of the LTE system, considering relaying for cost-effective throughput enhancement and coverage extension. The LTE-A system includes all of the features of the LTE system and several new ones, the most important of which are: carrier aggregation, enhanced multi-antenna support and relaying. The LTE system provides extensive support for deployment in spectrum allocations of various characteristics, with transmission bandwidths ranging from 1.4 MHz up to 20 MHz. In the LTE-A system, the transmission bandwidth can be further extended with carrier aggregation wherein multiple component carriers are aggregated and jointly used for transmission to/from a signal UE. In general, up to five component carriers can be aggregated, allowing for transmission bandwidth up to 100 MHz.

In order to provide better performance in LTE-A system (e.g. higher spectrum efficiency), multiple transmit antennas must be supported in the LTE-A. Demodulation reference signal (DM RS) design will influence channel estimation accuracy and eventually determine reliability and throughput. The DMRS is pre-coded and send through multiple antennas. The pre-coding may enhance reception performance to a mobile device or user and improve channel estimation performance.

Reference signals targeting PDSCH demodulation can be UE-specific, i.e., the physical downlink shared channel (PDSCH) and the demodulation reference signals intended for a specific UE are subject to the same precoding operation. Present only in resource blocks and layers scheduled by the eNodeB for transmission. Reference signals transmitted on different layers are mutually orthogonal at the eNodeB.

The design principle for the demodulation reference signals is an extension to multiple layers of the concept of 3GPP Rel-8 UE-specific reference signals used for beamforming. Complementary use of 3GPP Rel-8 cell-specific reference signals by the UE is not precluded.

Please further refer to FIG. 1, which illustrates a DM RS OCC pattern in the prior art. The DM RS pattern for rank 1-4 can be hybrid code division multiplexing (CDM) with frequency division multiplexing (FDM). Length-2 OCC might be used in time domain (CDM-T) with Walsh sequences {1, 1} and {1, -1}. Forward and reverse mappings take in turn from higher frequency to lower frequency. Common reference signal (CRS) is also placed on the frequency and time domain but it may not be pre-coded. The eNodeB may multiply the OCC with the associated DM RS signal and transmit through the associated antenna or antenna port.

Please refer to FIG. 2, which illustrates an exemplary DM RS OCC mapping with CDM for layers 1 and 2 in the prior art. This mapping ignores the CRS and the grey portion (non-slash part) shown in FIG. 1. The mapping considers two physical resource blocks (PRBs), each PRB is composed of 7 OFDM symbols in time domain and 12 subcarriers in frequency domain, and these two PRBs are contiguous in time domain.

For rank 1 and 2, the same DM RS structure (including patterns, spreading and scrambling) as in 3GPP LTE Rel-8/9 is used, as illustrated in FIG. 1. For rank 2, DM RS for 1st layer and that for 2nd layer are multiplexed by means of code division multiplexing (CDM) by using orthogonal cover code (OCC) over two consecutive resource elements (blue) in time domain.

For rank 3 and 4, the DM-RS pattern is illustrated in FIG. 1. DM-RS for 1st layer and that for 2nd layer are multiplexed by means of CDM by using OCC over two consecutive resource elements (blue) in time domain. DM RS for 3rd layer and that for 4th layer are multiplexed by means of CDM by using OCC over two consecutive resource elements (green) in time domain. DM-RS for 1st and 2nd layers and that for 3rd and 4th layers are multiplexed by means of frequency division multiplexing (FDM). The DM RS signals can apply a length-31 Gold sequence.

FIG. 3 is extended from FIG. 2 and considers the OCC mapping with Walsh codes {1, 1} and {1, -1}. This figure further considers frequency domain contiguous two PRBs. If there are two contiguous PRBs for a user, the successive PRB will apply reversed OCC mapping the previous PRB. It introduces 2-D orthogonality among layers and peak power randomization.

FIG. 4 shows DM-RS pattern for ranks 5-8. Hybrid CDM+FDM DM-RS patterns are used. Length-4 OCC in time domain (CDM-T) is used with Walsh sequences {1, 1, 1, 1}, {1, -1, 1, -1}, {1, 1, -1, -1}, {1, -1, -1, 1}. The design criteria for length-4 mappings are backward compatibility, 2-D orthogonality, peak power randomization. For backward compatibility with agreed mapping scheme for up to rank 2, OCC sequences for higher rank transmissions are desired to be a superset of that for rank transmissions. The eNodeB may multiply the OCC with the associated DM RS signal and transmit through the associated antenna or antenna port.

For 2-D orthogonality in time and frequency domains, time-domain orthogonality means subcarriers a, b, c and d are mapped to four resource elements (REs) in time domain and frequency-domain orthogonality means subcarriers a, b, c, d are mapped to closet four resource elements (REs) in frequency domain. For peak power randomization, it is achieved by time/frequency variation of OCC mapping within OFDMA symbols and subcarriers a, b, c, d are mapped such that subcarriers a, b, c, d are included in frequency domain. FIG. 5 illustrates an exemplary mapping for contiguous two PRBs. This maintains 2-D orthogonality while randomizing peak power.

These mappings depict that contiguous two PRBs will apply two patterns to achieve some of these three features: backward compatibility, 2-D orthogonality, peak power randomization. If a mobile station or user receives contiguous two PRBs, it may follow the order pattern A and pattern B. However, if a user receives multiple PRBs distributed on frequency domain, the rule may be different because these PRBs are not contiguous.

SUMMARY OF THE INVENTION

A method of reference signal pattern allocation in a wireless communication system is provided.

A method for reference signal pattern allocation for an eNodeB in a wireless communication system is disclosed. The method comprises allocating a plurality of physical resource blocks (PRBs) to at least one mobile device; and mapping a plurality of reference signal patterns same as a plurality of OCC reference signal patterns multiplied with the associated DM RS signal to the PRBs according to the OCC mapping rule; and transmit the reference signal patterns to the associated antenna or antenna port.

A communication device of handling reference signal pattern allocation in a wireless communication system is disclosed. The communication device comprises means for allocating a plurality of physical resource blocks (PRBs) to at least one mobile device; and means for mapping a plurality of reference signal patterns same as a plurality of OCC reference signal patterns multiplied with the associated DM RS signal to the PRBs according to the OCC mapping rule; and transmit the reference signal patterns to the associated antenna or antenna port.

A method for reference signal pattern allocation for a mobile device in a wireless communication system is disclosed. The method comprises receiving a plurality of physical resource blocks (PRBs) to from an eNodeB; and using a plurality of reference signal patterns same as a plurality of OCC reference signal patterns multiplied with the associated DM RS signal on the received PRBs according to the OCC mapping rule to receive or estimate signal for the associated antenna or antenna port.

A communication device for reference signal pattern allocation for a mobile device in a wireless communication system is disclosed. The communication device comprising means for receiving a plurality of physical resource blocks (PRBs) to from an eNodeB; and means for using a plurality of reference signal patterns same as a plurality of OCC reference signal patterns multiplied with the associated DM RS signal on the received PRBs according to the OCC mapping rule to receive or estimate signal for the associated antenna or antenna port.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 14-16 illustrate another UE-specific mapping rule derived from the mapping rule in FIG. 12.

FIGS. 17-18 illustrate another UE-specific mapping rule derived from mapping rule in FIG. 13.

DETAILED DESCRIPTION

Figure 6:
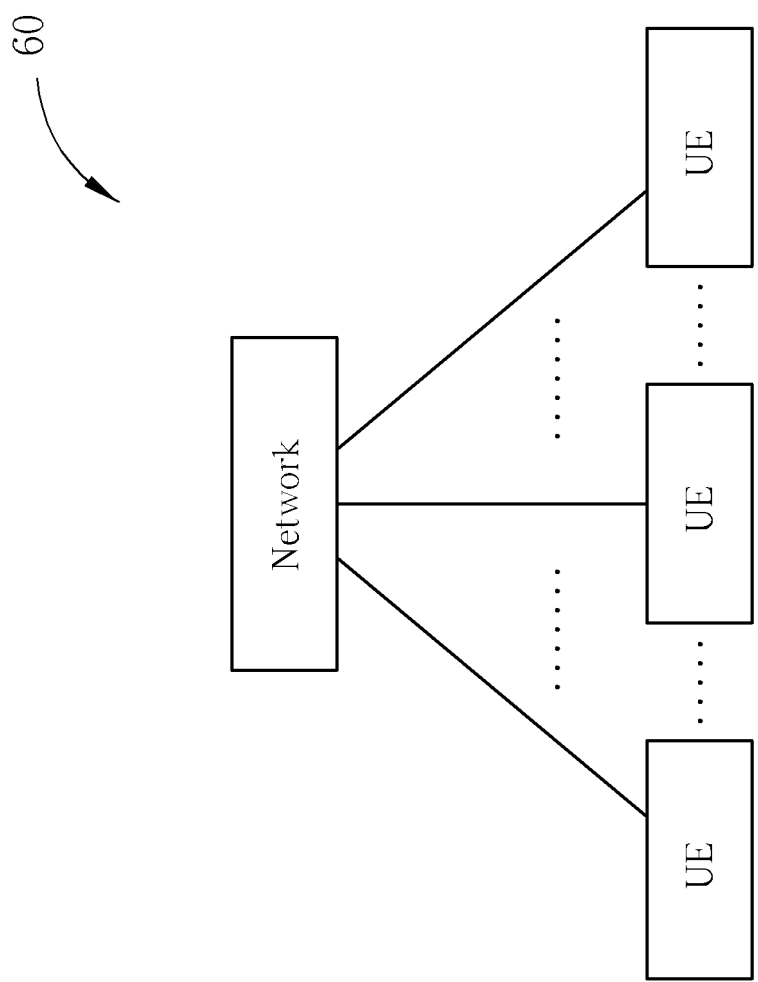
FIG. 6 is a schematic diagram of an exemplary wireless communication system.

Please refer to FIG. 6, which is a schematic diagram of an exemplary wireless communication system 60. The wireless communication system 60 can be an LTE-Advanced system, or other mobile communications systems supporting multiple component carriers with which simultaneous data transmission and/or reception can be performed. The wireless communication system 60 is briefly composed of an eNodeB and a plurality of user equipments (UEs). In FIG. 6, the eNodeB and the UEs are simply utilized for illustrating the structure of the wireless communications system 60. Practically, the network comprising a plurality of base stations, such as an E-UTRAN (evolved-UTRAN) comprising a plurality of eNodeBs in the LTE-A system. The UEs can be devices such as mobile phones, computer systems, etc. Besides, the eNodeB and the UE can be seen as a transmitter or receiver according to transmission direction, e.g., for uplink (UL), the UE is the transmitter and the eNodeB is the receiver, and for downlink (DL), the eNodeB is the transmitter and the UE is the receiver.

Figure 7:
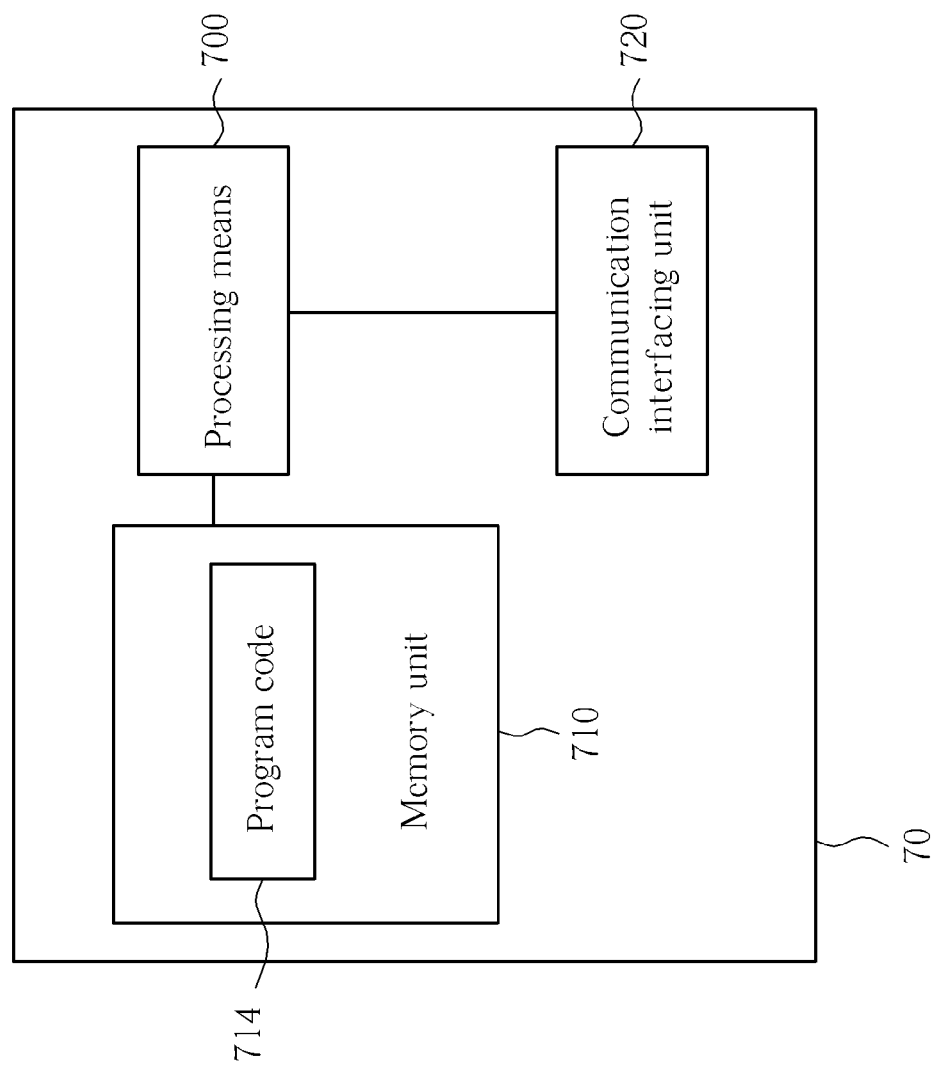
FIG. 7 is a schematic diagram of an exemplary communication device.

Please refer to FIG. 7. FIG. 7 is a schematic diagram of an exemplary communication device 70. The communication device 70 can be the UE or the eNodeB shown in FIG. 6 and may include a processing means 700 such as a microprocessor or ASIC, a memory unit 710, and a communication interfacing unit 720. The memory unit 710 may be any data storage device that can store program code 714 for access by the processing means 700. Examples of the memory unit 710 include but are not limited to a subscriber identity module (SIM), read-only memory (ROM), random-access memory (RAM), CD-ROMs, magnetic tapes, floppy disks, and optical data storage devices. The communication interfacing unit 720 is preferably a radio transceiver for wirelessly communicating with the eNodeB according to processing results of the processing means 700.

Figure 8:
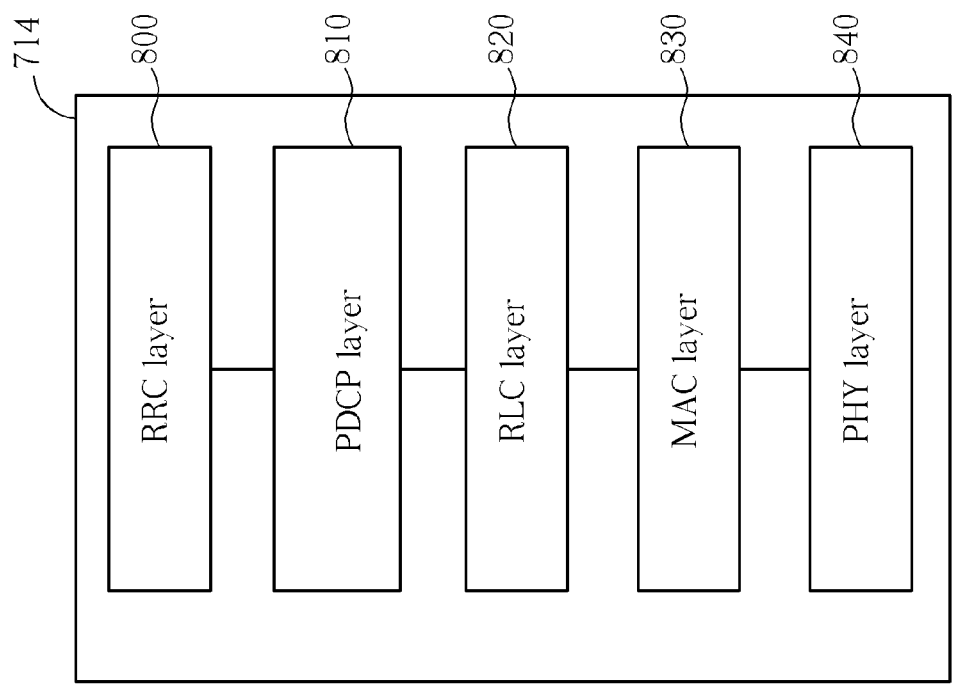
FIG. 8 illustrates an exemplary of protocol layer structure in FIG. 7.

Please refer to FIG. 8, which illustrates the program code 714 in FIG. 7. The program code 714 includes program code of multiple communications protocol layers, which from top to bottom are a radio resource control (RRC) layer 800, a packet data convergence protocol (PDCP) layer 810, a radio link control (RLC) layer 820, a medium access control (MAC) layer 830 and a physical (PHY) layer 840. The PHY layer 840 includes physical channels, such as Physical Random Access Channel (PRACH), Physical Uplink Control Channel (PUCCH), Physical Uplink Shared Channel (PUCCH), Physical Downlink Control Channel (PDCCH), Physical Downlink Shared Channel (PDCCH). Conveying indications of physical layer resource allocation is one of the major functions provided by PDCCHs. The physical layer 840 may also be implemented by ASIC and processed in processing means 700.

In each subframe, PDCCHs indicate the frequency domain resource allocation. The resource allocations are normally localized, meaning that a physical resource block (PRB) in the first half of a subframe is paired with the PRB at the same frequency in the second half of the subframe.

Demodulation reference signal (DM RS) is associated with transmission of data on the physical downlink shared channel (PDSCH) and physical uplink shared channel (PUSCH). The DM RS are primarily used for channel estimation for coherent demodulation. In order to multiplex signals from multiple antennas, DM RS is further multiplied with OCC pattern according to associated antennas or antenna ports. On UE side, UE can de-multiplex signal according to the associated OCC pattern.

Figure 1:
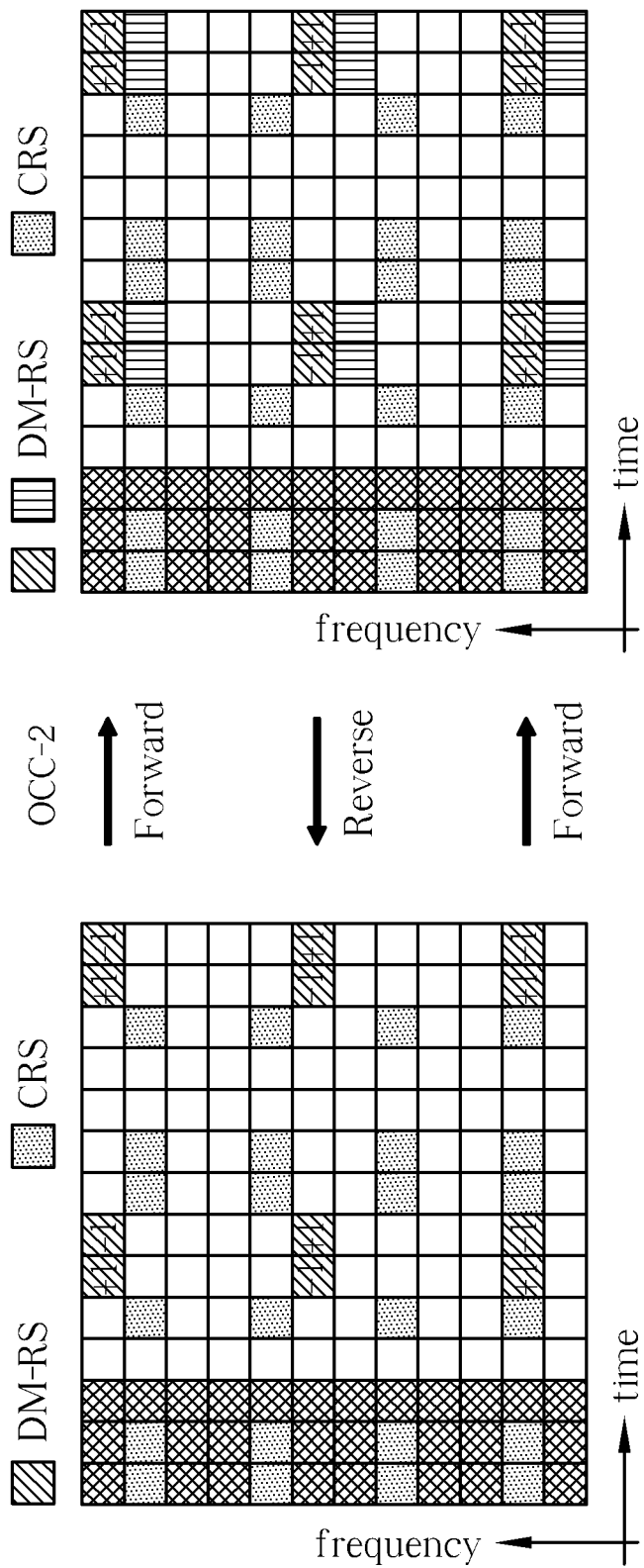
FIGS. 1-4 illustrates DM RS patterns in the prior art.
Figure 2:
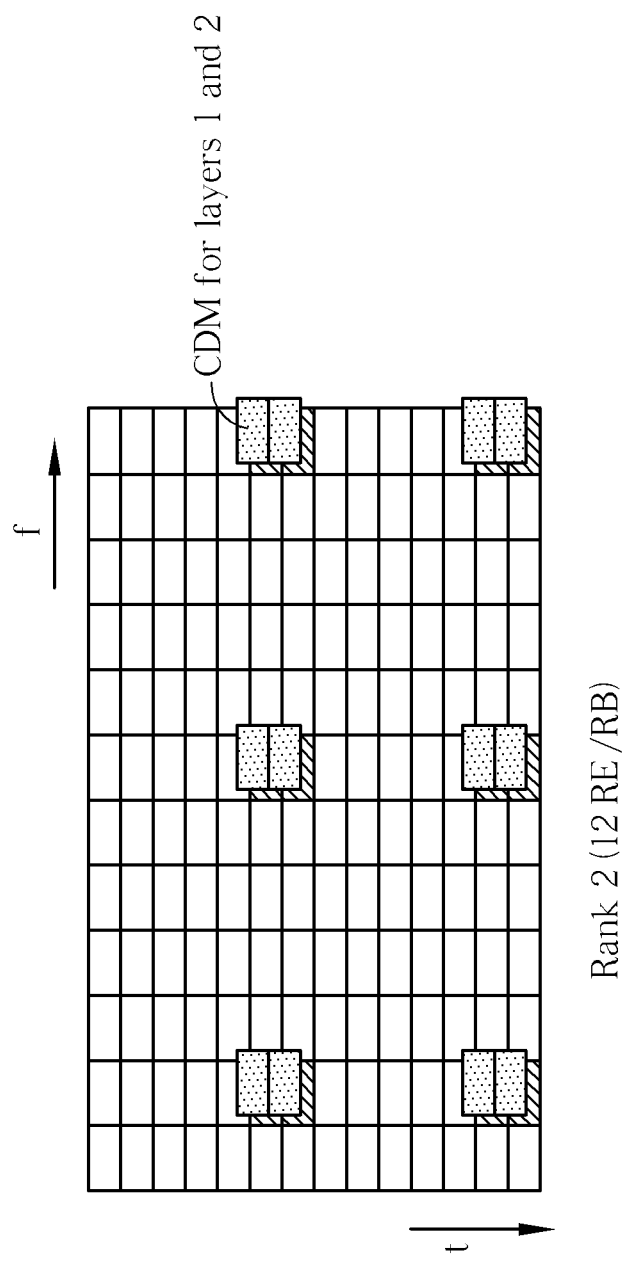
Figure 3:
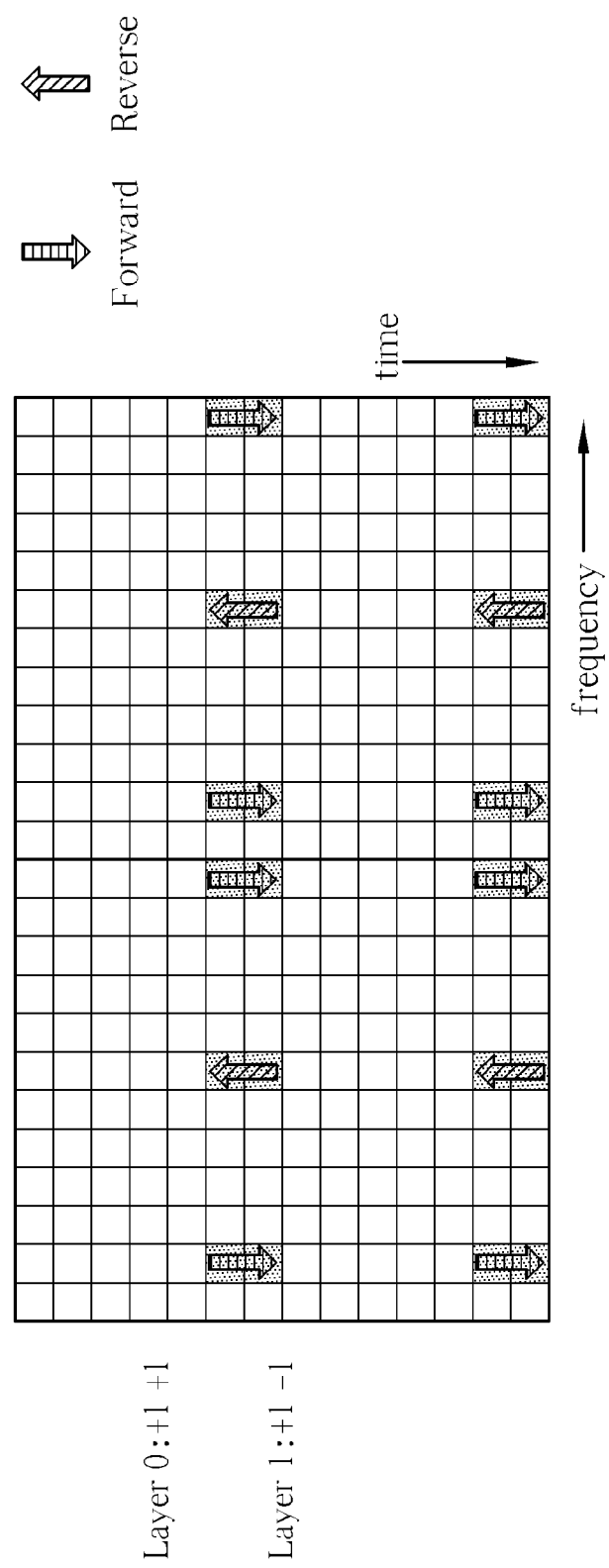
Figure 4:
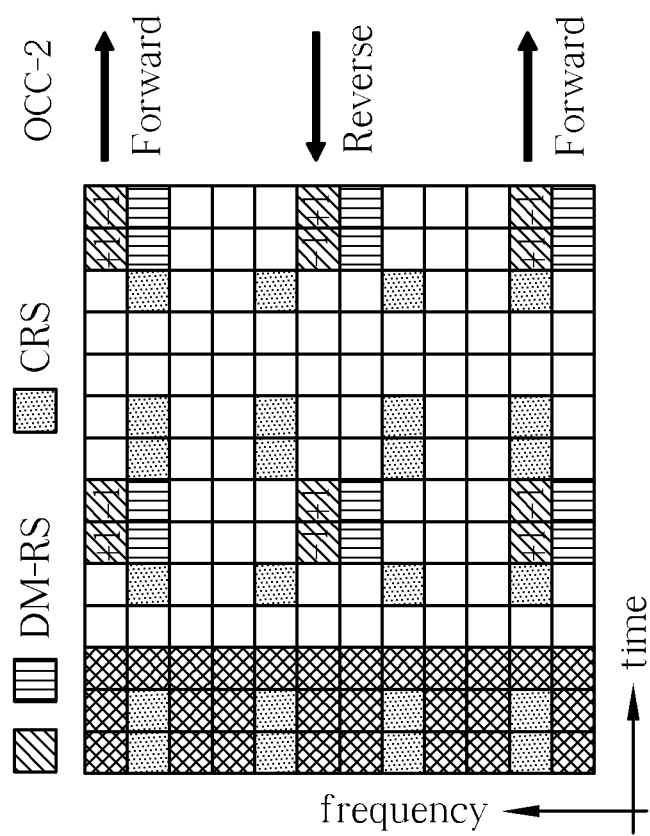
Figure 5:
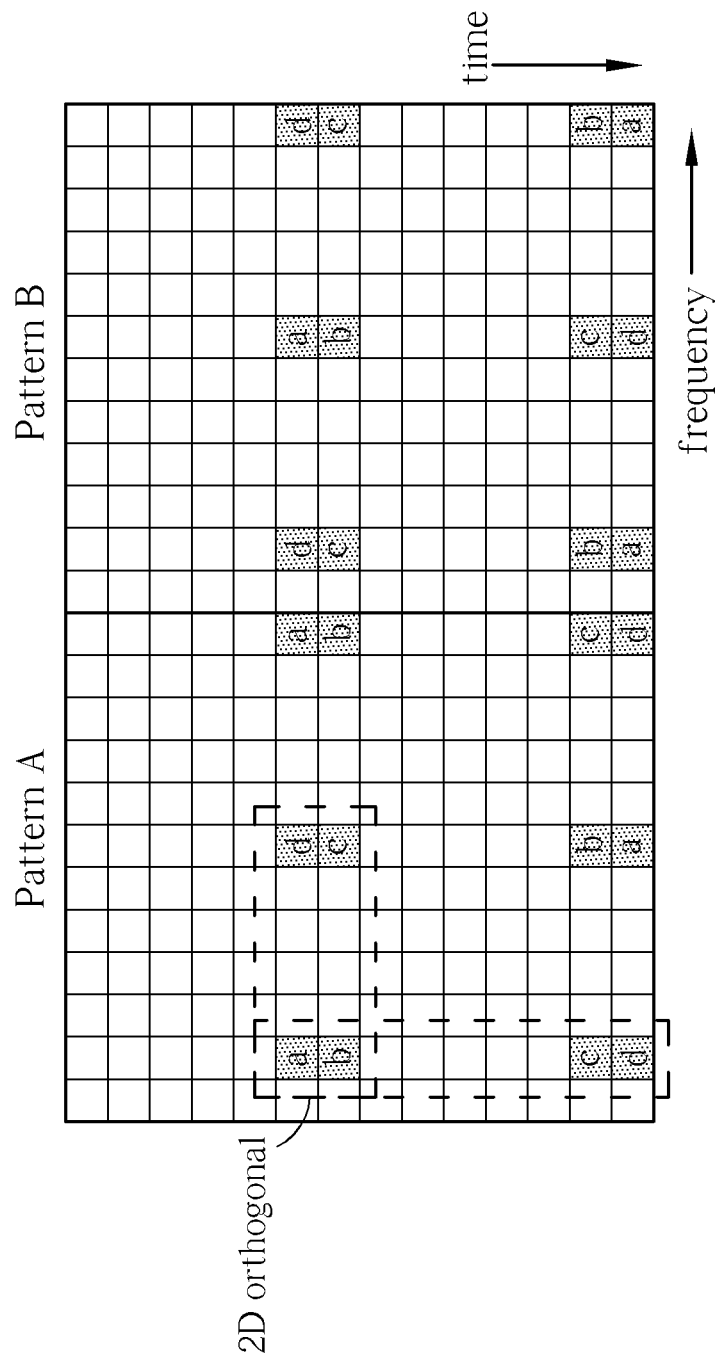
FIG. 5 is an exemplary mapping in the prior art.

The OCC mapping patterns can be length-2 Walsh code or length-4 Walsh code. According to FIG. 3, there are two OCC mapping patterns. The first OCC mapping pattern can be mapped as directions forward, reverse and forward and the second OCC mapping pattern can be mapped as directions reverse, forward and reverse in these two or four REs. The eNodeB can apply the associated OCC mapping pattern multiplying a sequence for the associated antenna ports.

Figure 9:
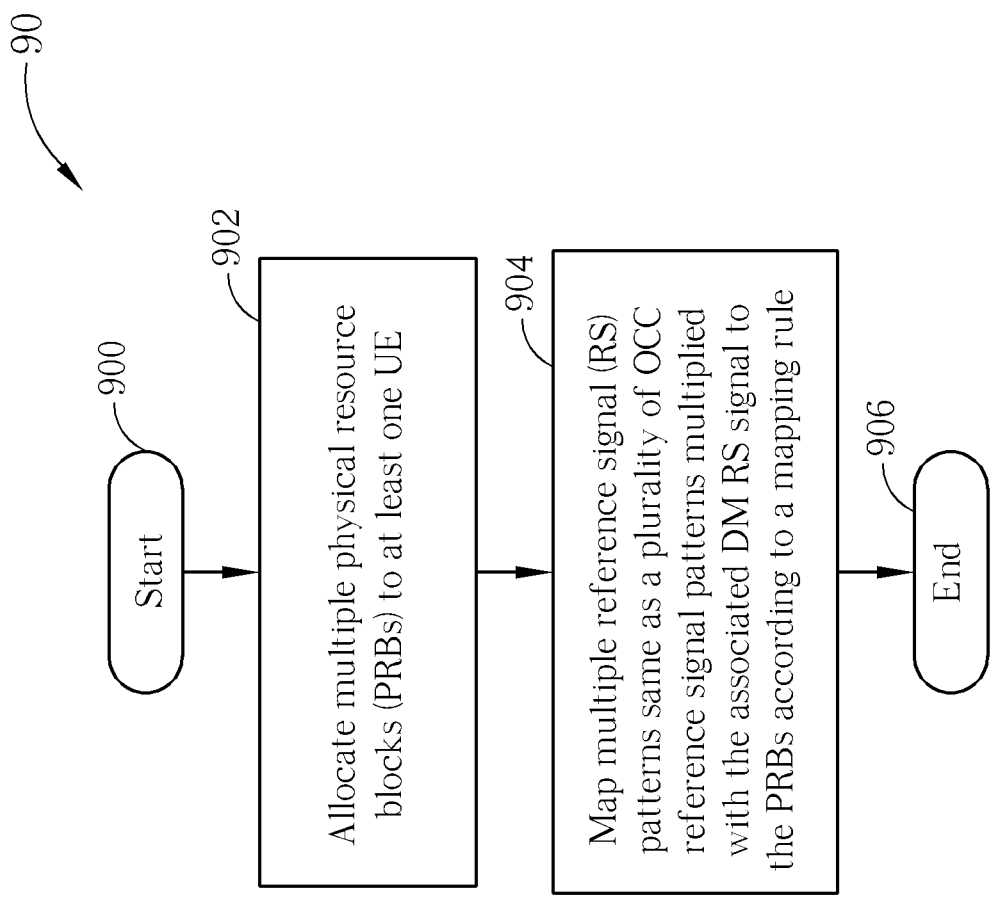
FIG. 9 is a flowchart of an exemplary process.

Please refer to FIG. 9, which is a flowchart of a process 90 according to an example of the present invention. The process 90 is used for reference signal pattern allocation for an eNodeB in a wireless communications system. Preferably, the wireless communications system can be referred as to the wireless communications system 60 and includes an eNodeB and the UE. The process 90 may be complied into the program code 714 and includes the following steps:

Step 900: Start.

Step 902: Allocate multiple physical resource blocks (PRBs) to at least one UE.

Step 904: Map multiple reference signal (RS) patterns same as a plurality of OCC reference signal patterns multiplied with the associated DM RS signal to the PRBs according to a mapping rule.

Step 906: End.

According to the process 90, the eNodeB may allocate multiple PRBs to at least one UE. Then, the eNodeB multiplies OCC patterns with DM RS sequences for CDM-multiplexed different antenna ports to the PRBs according to the OCC mapping rule but not specific to even number of contiguous PRBs allocated to a UE. The OCC mapping rule can be classified into UE-specific and cell-specific. The eNodeB can apply the length-2 Walsh code or the legnth-4 Walsh code for OCC mapping pattern with UE-specific or cell-specific allocation method for different antenna ports.

Figure 10:
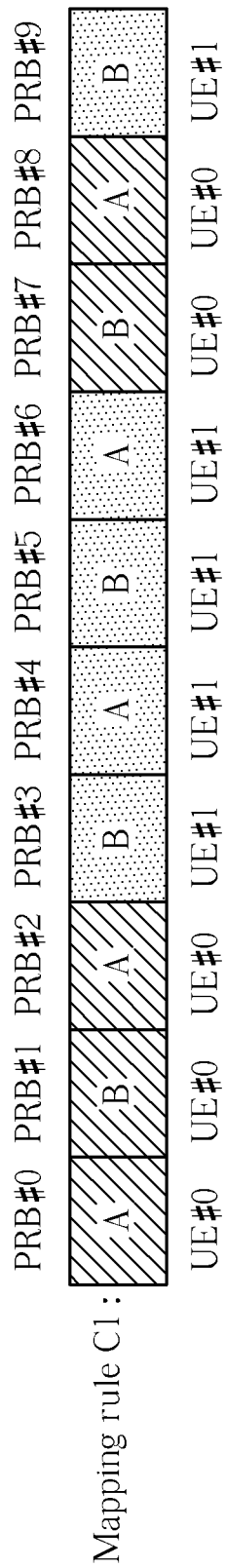
FIG. 10 illustrates a cell-specific mapping rule according to the present invention.

The mapping rule may be cell-specific or UE-specific. When the OCC mapping rule is cell-specific, the eNodeB may map the multiple reference signal patterns to all the PRBs according to the index numbers of the PRBs. Namely, the OCC mapping rule only depends on whole band PRB index regardless of UE's resource allocation. Please refer to FIG. 10, which illustrates a cell-specific mapping rule C1 according to the present invention. In FIG. 10, all PRBs are fully used. An OCC pattern A and an OCC pattern B take in turn in frequency domain, mapped to the PRBs. If the pattern A is mapped to PRB#0, the pattern B is mapped to PRB#1. By the same token, the pattern A and the pattern B are alternatively mapped to the all PRBs regardless of UE's resource allocation.

Figure 11:
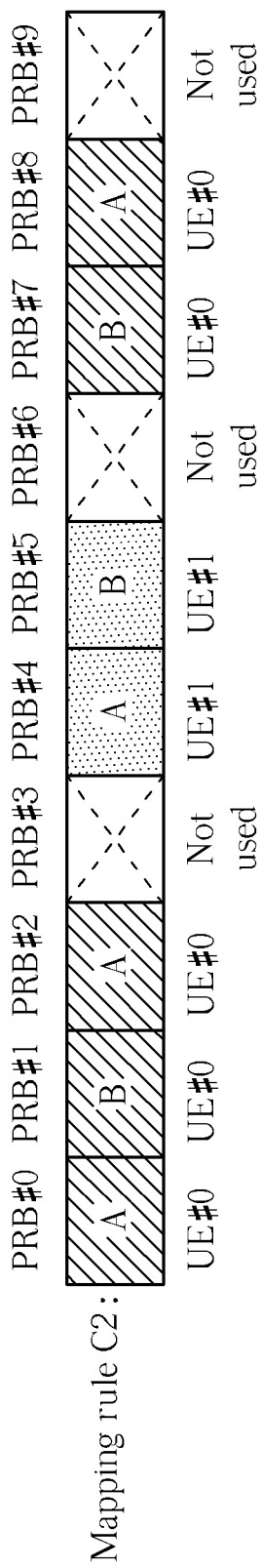
FIG. 11 illustrates another cell-specific mapping rule according to the present invention.

In some examples, a part of the PRBs remain unused. Please refer to FIG. 11, which illustrates another cell-specific OCC mapping rule C2 according to the present invention. In FIG. 11, there are 10 PRBs in whole band and three PRBs are not used for data transmission. The indexes of un-used PRBs are PRB#5, PRB#6 and PRB#9. The remaining PRBs are allocated to two users for data transmission. The OCC pattern A and the OCC pattern B are mapped to the used PRBs in turn, skipping those unused PRBs.

Figure 12:
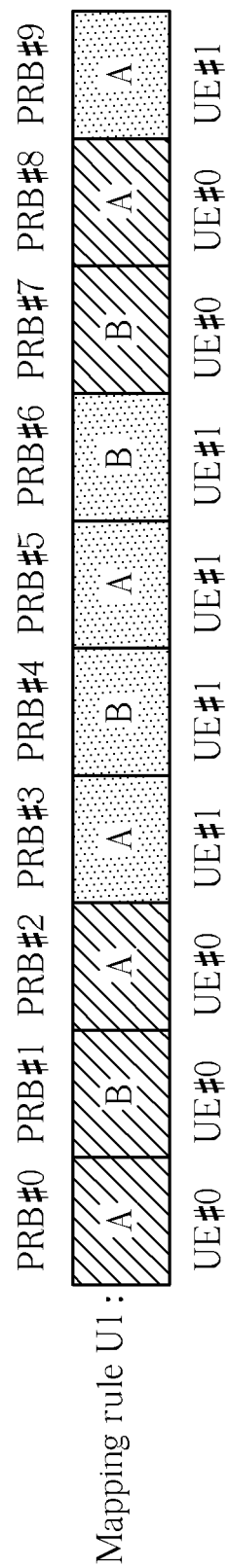
FIG. 12 illustrates a UE-specific mapping rule according to the present invention.

On the other hand, each UE may receive multiple PRBs in a distributed manner and composed of multiple PRB clusters (PRBCs). The first OCC pattern of each contiguous PRB cluster can be different and depend on the last OCC pattern in the previous PRB cluster. Therefore, when the mapping rule is UE-specific, the eNodeB cyclically may use the multiple OCC patterns to all allocated PRBs of each UE in a PRB index order. In other words, mapping rules can depend on UE's allocation PRB index number. Each of UEs is taken into account individually. Please refer to FIG. 12, which illustrates a UE-specific OCC mapping rule U1 according to the present invention. In FIG. 12, taking a UE#0 as an example, an OCC pattern A is used as the first pattern. Then, an OCC pattern B and the pattern A take turns, being used to the PRBs of the UE#0 in the PRB index order of the PRBs of the UE#0.

Figure 13:
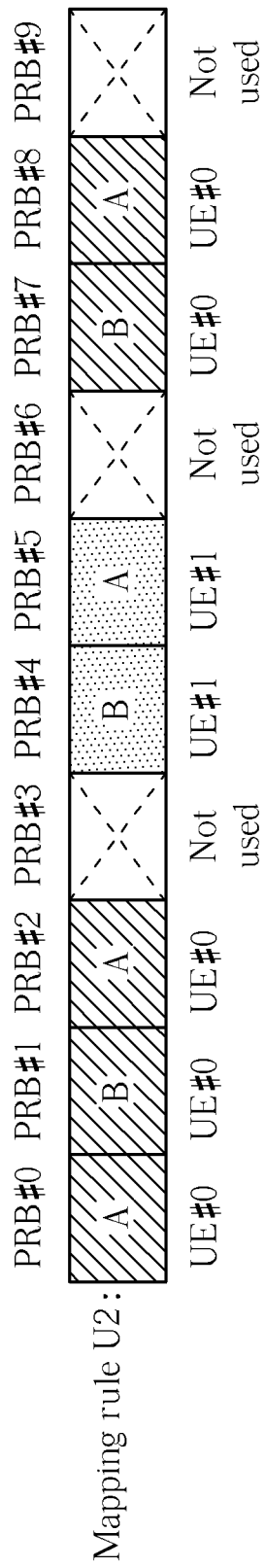
FIG. 13 illustrates another UE-specific mapping rule according to the present invention.

In some examples, a part of the PRBs remain unused. Please refer to FIG. 13, which illustrates another UE-specific OCC mapping rule U2 according to the present invention. In FIG. 13, there are 10 PRBs in whole band and three PRBs are not used for data transmission. The indexes of un-used PRBs are PRB#5, PRB#6 and PRB#9. The remaining PRBs are allocated to two users for data transmission. The OCC pattern A and the OCC pattern B take turn to map to all the used PRBs of each UE. One UE may receives multiple PRBs for the UE and the OCC patterns take turns to allocated PRBs for the UE.

Figure 14:
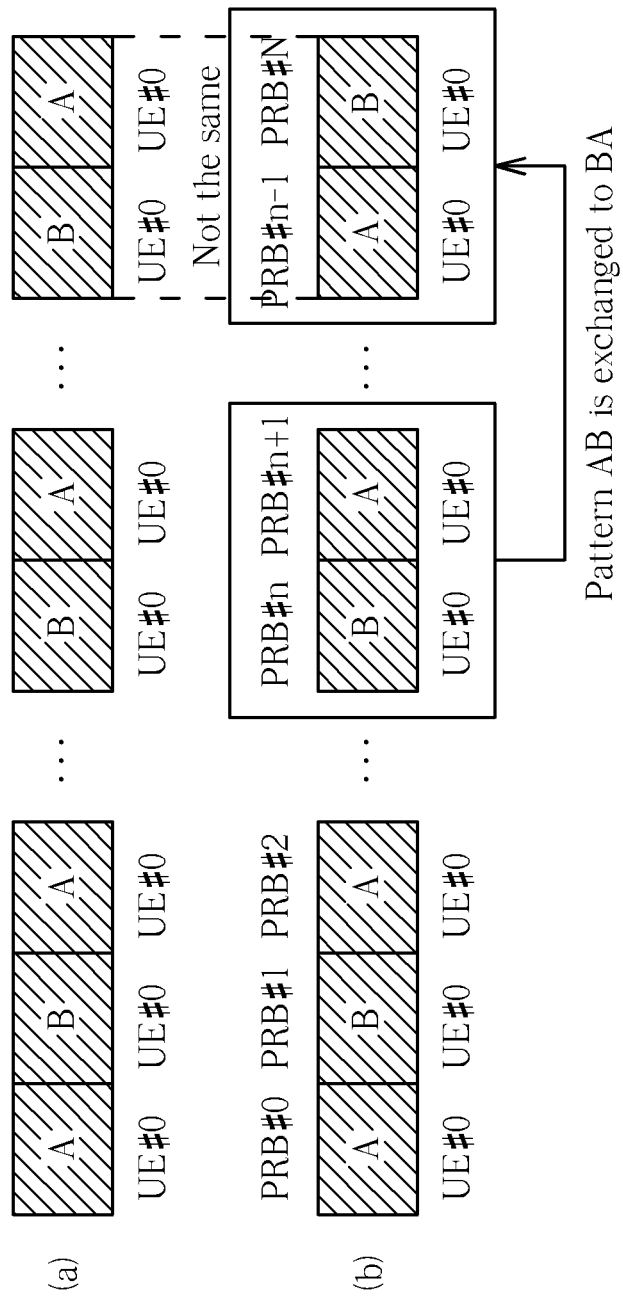
Figure 15:
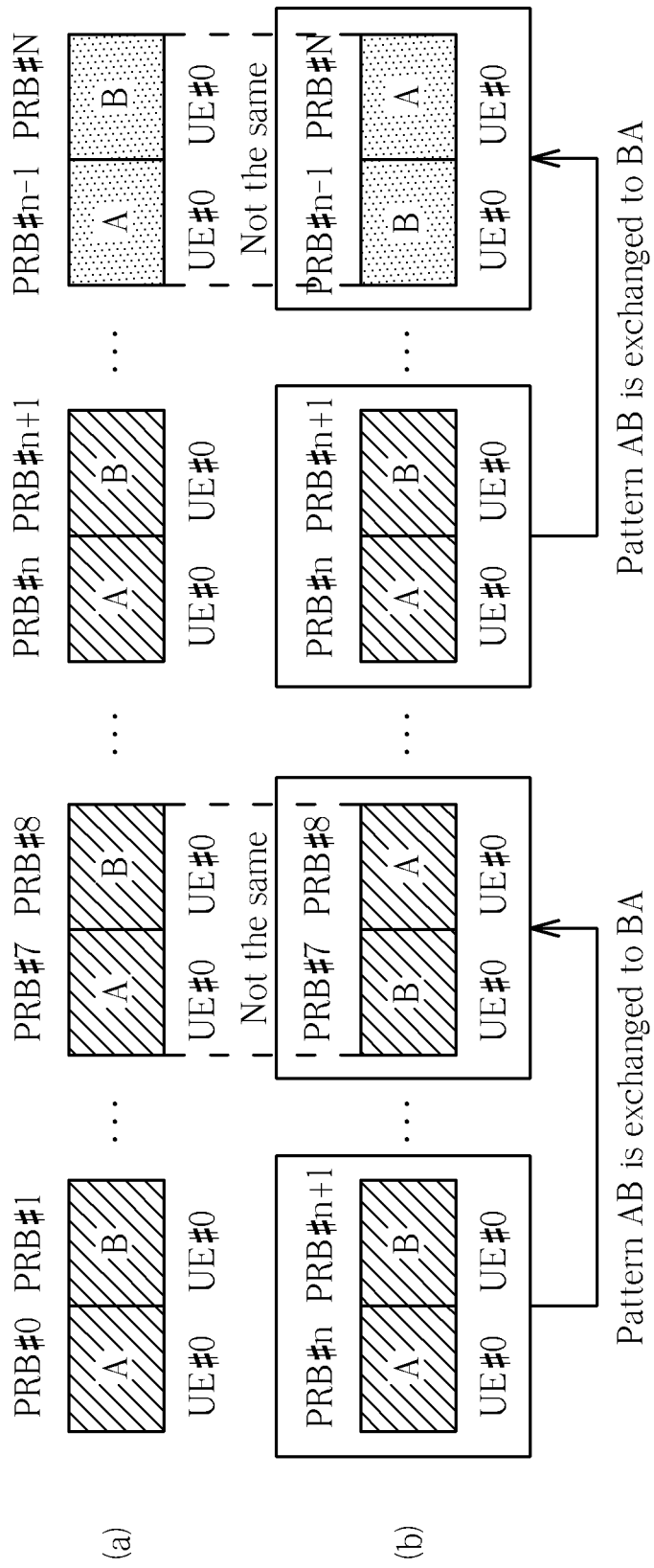

Please refer to FIGS. 14-16, which illustrate another UE-specific OCC mapping rule U3 derived from OCC mapping rule U1. In FIG. 14, the diagram (a) illustrates the original mapping rule U1. The diagram (b) is a variation of the mapping rule U1. As shown in the diagram (b) of FIG. 14, PRB#N-1 and PRB#N switch the OCC patterns. In FIG. 15, the diagram (a) illustrates the original mapping rule U1 and the diagram (b) is the variations of the mapping rule U1. Compared to diagram (a), PRB#7 and PRB#8 switch the patterns in diagram (b). Similarly, PRB#N-1 and PRB#N switch the OCC patterns. FIG. 16 shows more variations according to the OCC mapping rule U1. NPRB in FIG. 16 denotes the contiguous PRBs in frequency domain, called a PRB group (PRG), which can be bundled for OCC mapping. In FIG. 16, diagrams (a), (b), (c) and (d) roughly show OCC patterns for a certain UE with different NPRB, based on the OCC mapping rule U1 while diagrams (a'), (b'), (c') and (d') are corresponding variations, respectively. As seen in FIG. 16, when NPRB is equal to four, the OCC patterns based on the OCC mapping rule U1 are arranged as ABAB ABAB ABAB ABAB in (a). The OCC patterns could be rearranged as ABAB BABA ABAB BABA in (a'). When NPRB is equal to two and three, the patterns based on the OCC mapping rule U1 are arranged as ABA BAB AB AB in (b). The OCC patterns could be rearranged as ABA BAB AB BA in (b'). If the OCC patterns based on the mapping rule U1 are arranged as ABA BA BAB AB for NPRB equal to two and three in (c), the patterns could be rearranged as ABA BA BAB AB in (c'). When NPRB is equal to two and four, the OCC patterns based on the OCC mapping rule U1 are arranged as ABAB ABAB AB AB in (d). The patterns could be rearranged as ABAB BABA AB BA in (d'). If the OCC patterns based on the OCC mapping rule U1 are arranged as ABA AB ABAB AB for NPRB equal to two and four in (e), the OCC patterns could be rearranged as ABAB AB BABA BA in (e').

Figure 17:
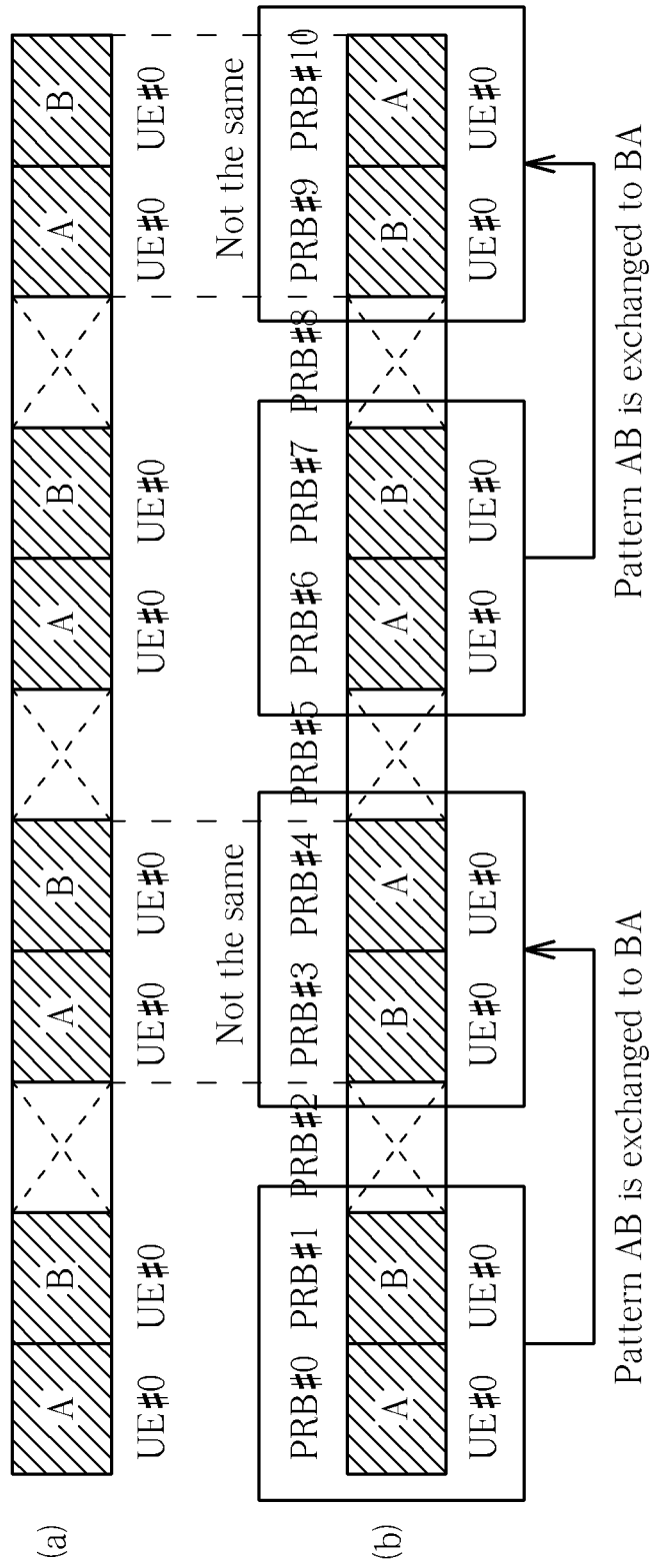

Please refer to FIGS. 17-18, which illustrate another UE-specific OCC mapping rule U4 derived from mapping rule U2. In FIG. 17, the diagram (a) illustrates the original OCC mapping rule U2 and the diagram (b) is a variation of the OCC mapping rule U2. Compared to diagram (a), PRB#3 and PRB#4 switch the OCC patterns; PRB#9 and PRB#10 switch the OCC patterns in diagram (b). FIG. 18 shows more variations according to the OCC mapping rule U1, wherein X represent unused PRBs. In FIG. 18, diagrams (a), (b), (c), (d) and (e) roughly show OCC patterns for a certain UE with different NPRB, based on the OCC mapping rule U2 while diagrams (a'), (b'), (c'), (d') and (e') are corresponding variations, respectively. As seen in FIG. 18, when NPRB is equal to four, the patterns based on the OCC mapping rule U1 are arranged as ABAB ABABXABABXABABXABAB in (a). The OCC mapping patterns could be rearranged as ABABX-BABAXABABXBABA in (a'). When NPRB is equal to two and three, the patterns based on the OCC mapping rule U1 are arranged as ABAXBABXABXAB in (b). The OCC mapping patterns could be rearranged as ABAXBABXABXBA in (b'). If the OCC mapping patterns based on the OCC mapping rule U1 are arranged as ABAXBAXBABXAB for NPRB equal to two and three in (c), the OCC mapping patterns could be rearranged as ABAXBAXBABXAB in (c'). When NPRB is equal to two and four, the OCC mapping patterns based on the OCC mapping rule U1 are arranged as ABABXABABX-ABXAB in (d). The OCC mapping patterns could be rearranged as ABABXBABAXABXBA in (d'). If the OCC mapping patterns based on the OCC mapping rule U1 are arranged as ABAXABXABABXAB for NPRB equal to two and four in (e), the OCC mapping patterns could be rearranged as ABABXABXBABAXBA in (e').

One UE may receives multiple PRBs for the UE and the OCC pattern A and OCC pattern B take turns to first contiguously allocated PRBs for the UE and the OCC pattern B and OCC pattern A take turns to next contiguously allocated PRBs for the UE, and so on. Adjacent contiguous allocated PRBs apply different OCC pattern orders.

One UE may receives multiple PRBs for the UE and the OCC pattern A and OCC pattern B take turns for each contiguously allocated PRBs for the UE.

Figure 19:
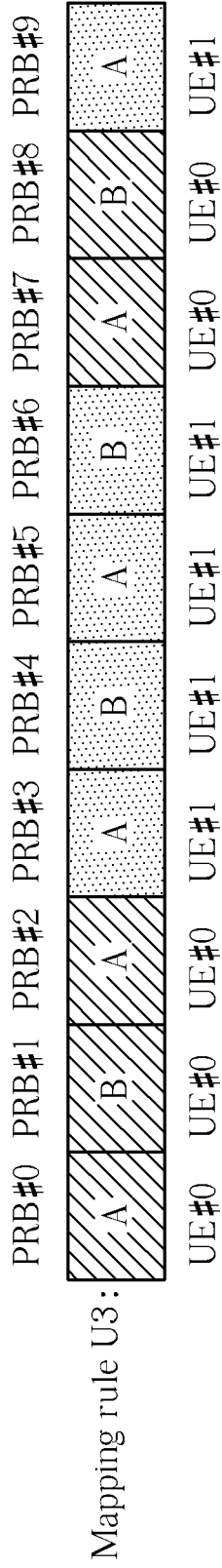
FIG. 19 illustrates a UE-specific mapping rule according to the present invention.

For UE-specific OCC mapping rule, there is an alternative for the eNodeB to map the multiple OCC patterns to PRBs. The OCC patterns may be cyclically mapped to each of PRB clusters of each UE in PRB index order. In other words, each PRB cluster could serve as a basis for mapping. The eNodeB considers each cluster instead of the total PRBs or the PRBs allocated to each UE. Please refer to FIG. 19, which illustrates a UE-specific OCC mapping rule U3 according to the present invention. In FIG. 19, a pattern A is used as the first pattern in the first PRB cluster of the UE#0 and followed by a patter B. The OCC patterns A and B are mapped to the PRBs of the first cluster by turns in the PRB index order. A second cluster starts from the OCC pattern A again.

Figure 20:
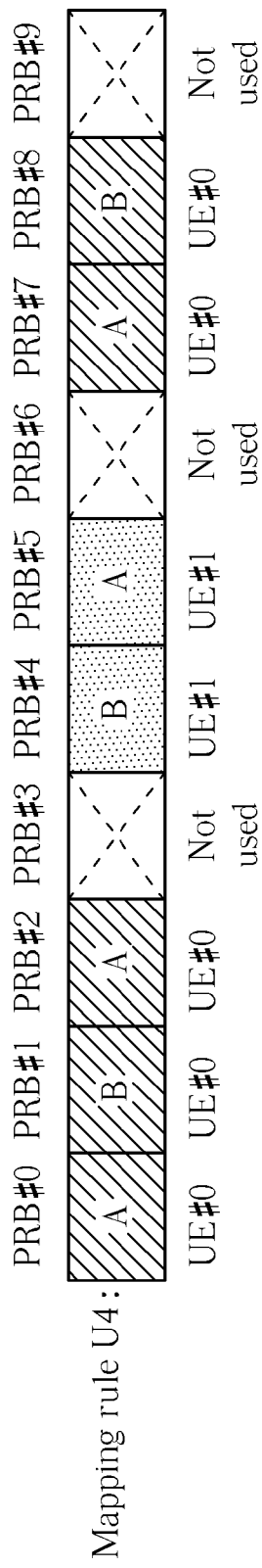
FIG. 20 illustrates another UE-specific mapping rule according to the present invention.

In some examples, a part of the PRBs remain unused. Please refer to FIG. 20, which illustrates another UE-specific OCC mapping rule U4 according to the present invention. In FIG. 20, there are 10 PRBs in whole band and three PRBs are not used for data transmission. The indexes of un-used PRBs are PRB#5, PRB#6 and PRB#9. The remaining PRBs are allocated to two users for data transmission. The OCC pattern A and the OCC pattern B take turn to map to the used PRBs of each cluster. The next group starts with the OCC pattern A again.

Figure 21:
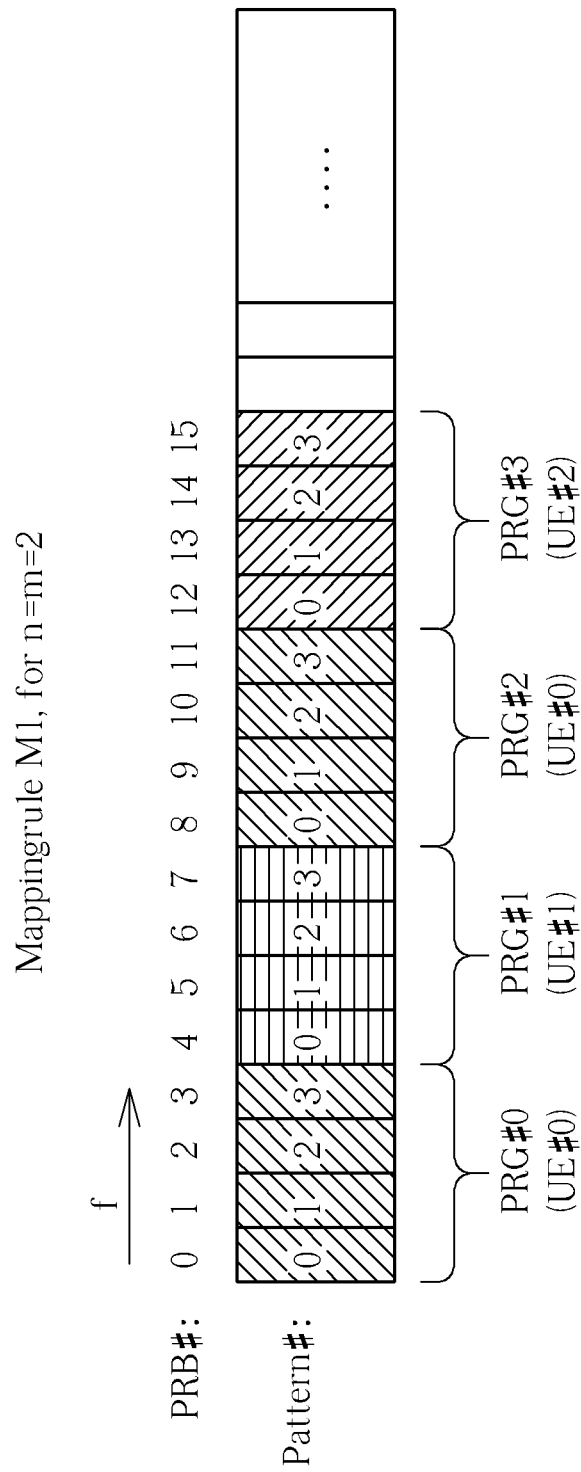
FIG. 21 illustrates an exemplary mapping rule according to the present invention.

In addition, the eNodeB may bundle the multiple PRBs into several PRB groups (so called PRGs). The number of contiguous PRBs (NPRB) in each group can be 2 to power of n, namely, $2^n$, where n is from 0 to 2. Preferably, n can be 1 or 2 (i.e. NPRB=2 or 4) for achieving best performance (due to period of length-4 OCC in frequency domain). In addition, contiguous PRBs in frequency domain allocated to at least one UE can be bundled for transmission. The number of the contiguous PRBs allocated to each UE is designated as MPRB. MPRB can be 2 to power of m, i.e. $2^m$, where m is from 0 to 2. Preferably, m can be 1 or 2 (i.e. MPRB=2 or 4) for achieving best performance (due to period of length-4 OCC in frequency domain). Please note that it is not necessary that MPRB is equal to NPRB. Please refer to FIG. 21, which illustrates an exemplary OCC mapping rule M1. In FIG. 21, NPRB is equal to MPRB, i.e. n=m=2. Four PRBs are bundled together, forming PRB groups. In FIG. 21, PRB#0, PRB#1, PRB#2 and PRB#3 form a PRB group PRG#0, which is allocated to the UE#0. PRB#4; PRB#5, PRB#6 and PRB#7 form a PRB group PRG#1, which is allocated to the UE#1; PRB#8, PRB#9, PRB#10 and PRB#11 form a PRB group PRG#2, which is allocated to the UE#0; PRB#12, PRB#13, PRB#14 and PRB#15 form a PRB group PRG#3, which is allocated to the UE#1.

Figure 22:
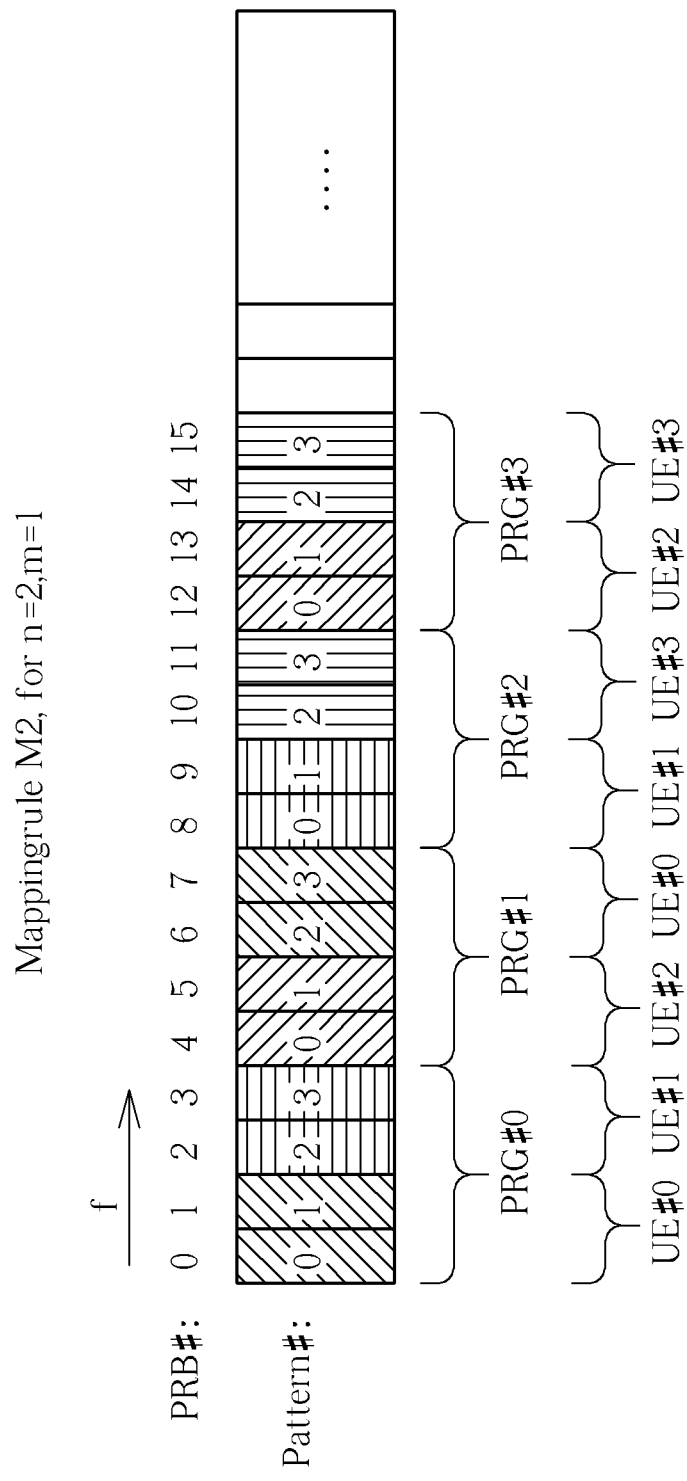
FIG. 22 illustrates an exemplary mapping rule according to the present invention.

Please refer to FIG. 22, which illustrates an exemplary OCC mapping rule M2. In FIG. 22, NPRB is not equal to MPRB, i.e. n=2, m=1. Four PRBs are bundled together, forming PRB groups but only two contiguous PRB are allocated to each UE. In FIG. 22, PRB#0, PRB#1, PRB#2 and PRB#3 can form a PRB group PRG#0. PRB#0 and PRB#1 are allocated to the UE#0 while PRB#2 and PRB#3 are allocated to the UE#1. Please note that further modification and alternative embodiments of various aspects of the present invention may be apparent to those skilled in the art in view of this description. Accordingly, this description is to be construed as illustrative only and is for the purpose of teaching those skilled in the art the general manner of carrying out the invention. Changes may be made in the values of n and m. According to different n and m, many combinations would be made for a user to share the same PRG with specific OCC pattern. For example: 4 users or mobile stations and each uses one OCC pattern.

Therefore, the eNodeB can allocate any number of PRBs for a user or a UE and the OCC pattern rule follows the associate OCC pattern. The user or the UE may receive accordingly with the associated DMRS multiplied by the OCC pattern and a base station (e.g. eNodeB) or transmitter may send the DM RS multiplied by the OCC pattern as one of examples.

Certainly, Wash code may be applied to the above-mentioned mapping rule with forward and reverse mapping.

Please note that the abovementioned steps including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20 in which the processing means 200 processes the program code 214 related to the abovementioned processes and the processed results can enhance uplink transmission in the wireless communications system 10.

To sum up, the examples of the present invention discloses several methods (e.g. cell-specific or UE-specific) to multiply orthogonal cover code patterns with DM RS to resource blocks, thereby avoiding channel estimation error. When a user receives multiple PRBs distributed on frequency domain, the mapping rules of the present invention may work although these PRBs are not contiguous.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for reference signal pattern allocation for an eNodeB in a wireless communication system, the method comprising:
   allocating a plurality of physical resource blocks (PRBs) to at least one mobile device; and
   mapping a plurality of reference signal patterns same as a plurality of orthogonal cover code (OCC) reference signal patterns multiplied with the associated demodulation reference signal to the PRBs according to an OCC mapping rule, wherein the OCC reference signal pattern applies length-2 or length-4Walsh code OCC mapping according to antenna port and the direction of length-2 or length-4 Walsh code OCC sequences are mapped forward, reverse and forward on 14 OFDM symbols in time domain and 12 subcarriers in frequency domain.

2. The method of claim 1, wherein the OCC reference signal pattern applies length-2 or length-4 Walsh code OCC mapping according to antenna port and the direction of length-2 or length-4 Walsh code OCC sequences are mapped forward, reverse and forward on 14 OFDM symbols in time domain and 12subcarriers in frequency domain.

3. The method of claim 2, wherein the demodulation reference signal is generated by a length-31 Gold sequence according to the index of the allocated resource block and initial value.

4. The method of claim 1, wherein the demodulation reference signal is generated by a length-31 Gold sequence according to the index of the allocated resource block and initial value.

5. The method of claim 1, wherein the mapping rule comprises mapping the plurality of reference signal patters to the plurality PRBs according to a plurality of index numbers of the plurality of PRBs when the mapping rule is cell-specific.

6. The method of claim 5 further comprising mapping a first reference signal pattern to odd PRBs of the plurality of PRBs and a second signal pattern to even PRBs of the plurality of PRBS, wherein the odd PRBs are assigned odd index number, the even PRBs are assigned even index number.

7. The method of claim 1, wherein the mapping rule comprises cyclically mapping the plurality of reference signal patters to PRBs of each mobile device in a PRB index order of the PRBs of each mobile device when the mapping rule is UE-specific.

8. The method of claim 7 further comprising:
   mapping a first reference signal pattern and a second reference signal pattern in turn to allocated PRBs for the first mobile device.

9. The method of claim 7 further comprising:
   mapping a first reference signal pattern and a second reference signal pattern in turn to first contiguously allocated PRBs for the first mobile device and mapping a second reference signal pattern and a first reference signal pattern in turn to second contiguously allocated PRBs for the first mobile device.

10. The method of claim 7 further comprising:
    mapping a first reference signal pattern and a second reference signal pattern in turn to first contiguously allocated PRBs for the first mobile device and mapping a first reference signal pattern and a second reference signal pattern in turn to second contiguously allocated PRBs for the first mobile device.

11. The method of claim 7 further comprising: switching a first reference signal pattern of a first PRB with a second reference signal pattern of a second PRB when a third reference signal pattern of a third PRB is the same as the first reference signal pattern of the first PRB and a fourth reference signal pattern of a fourth PRB is the same as the second reference signal pattern of the second PRB.

12. The method of claim 7 further comprising: switching at least one first reference signal pattern in a first PRB group with at least one second reference signal pattern in the first PRB group when all reference signal patterns in the first PRB group is arranged identically the same as the ones in a second PRB group, wherein the plurality of PRBs comprises PRBs of the first PRB group and PRB of the second PRB group.

13. The method of claim 1, wherein the mapping rule comprises cyclically mapping the plurality of reference signal patters to each of a plurality of PRB groups in a PRB index order of each of the plurality PRB groups when the mapping rule is UE-specific.

14. The method of claim 13 further comprising:
    mapping a first reference signal pattern to odd PRBs of a first PRB group and a second reference signal pattern to even PRBs of the first PRB group, wherein the odd PRBs of the first PRB group are assigned odd index numbers, the even PRBs of the first PRB group are assigned even index numbers; and
    mapping the first reference signal pattern to odd PRBs of a second PRB group and the second reference signal pattern to even PRBs of the second PRB group, wherein the odd PRBs of the second PRB group are assigned odd index number, the even PRBs of the second PRB group are assigned even index number;
    wherein, the plurality of PRB groups comprise the first PRB group and the second PRB group.

15. The method of claim 13 further comprising:
    mapping a first reference signal pattern to odd PRBs of a first PRB group and a second reference signal pattern to even PRBs of the first PRB group except for unused PRBs of the first PRB group, wherein the odd PRBs of the first PRB group are assigned odd index numbers, the even PRBs of the first PRB group are assigned even index numbers; and
    mapping the first reference signal pattern to odd PRBs of a second PRB group and the second reference signal pattern to even PRBs of the second PRB group except for unused PRBs of the second PRB group, wherein the odd PRBs of the second PRB group are assigned odd index number, the even PRBs of the second PRB group are assigned even index number;
    wherein, the plurality of PRB groups comprise the first PRB group and the second PRB group.

16. The method of claim 1, wherein the plurality of PRBs are all used or partially used.

17. The method of claim 1 further comprising bundling the plurality of PRBs into a plurality of PRB groups, the number of PRBs in each group is power of two.

18. The method of claim 17, wherein mapping the plurality of resource signal patterns to the PRBs according to the mapping rule comprises mapping at least one of the plurality of reference signal patterns to each PRB group.

19. A communication device of handling reference signal pattern allocation in a wireless communication system, the communication device comprising:
   means for allocating a plurality of physical resource blocks (PRBs) to at least one mobile device; and
   means for mapping a plurality of reference signal patterns same as a plurality of OCC reference signal patterns multiplied with the associated DM RS signal to the PRBs according to an OCC mapping rule, wherein the reference signal pattern is the demodulation reference signals on 7 OFDM symbols in time domain and 12 subcarriers in frequency domain multiplied by length-2 or length-4 Walsh code OCC mapping according to antenna port and the direction of length-2 or length-4 Walsh code OCC sequences are mapped reverse, forward and reverse on 14 OFDM symbols in time domain and 12 subcarriers in frequency domain.

20. The communication device of claim 19 wherein the OCC reference signal pattern applies length-2 or length-4 Walsh code OCC mapping according to antenna port and the direction of length-2 or length-4 Walsh code OCC sequences are mapped forward, reverse and forward on 14 OFDM symbols in time domain and 12 subcarriers in frequency domain.

21. The communication device of claim 20, wherein the demodulation reference signal is generated by a length-31 Gold sequence according to the index of the allocated resource block and initial value.

22. The communication device of claim 19, wherein the demodulation reference signal is generated by a length-31 Gold sequence according to the index of the allocated resource block and initial value.

23. The communication device of claim 19, wherein the OCC mapping rule comprises mapping the plurality of reference signal patters to the plurality PRBs according to a plurality of index numbers of the plurality of PRBs when the OCC mapping rule is cell-specific.

24. The communication device of claim 23 further comprising means for mapping a first reference signal pattern to odd PRBs of the plurality of PRBs and a second signal pattern to even PRBs of the plurality of PRBS, wherein the odd PRBs are assigned odd index number, the even PRBs are assigned even index number.

25. The communication device of claim 19, wherein the OCC mapping rule comprises cyclically mapping the plurality of reference signal patters to all PRBs of each mobile device in an order of the index numbers when the OCC mapping rule is UE-specific.

26. The communication device of claim 25 further comprising:
   means for mapping a first reference signal pattern and a second reference signal pattern in turn to allocated PRBs for the first mobile device.

27. The communication device of claim 25 further comprising:
   means for mapping a first reference signal pattern and a second reference signal pattern in turn to first contiguously allocated PRBs for the first mobile device and mapping a second reference signal pattern and a first reference signal pattern in turn to second contiguously allocated PRBs for the first mobile device.

28. The communication device of claim 25 further comprising:
   means for mapping a first reference signal pattern and a second reference signal pattern in turn to first contiguously allocated PRBs for the first mobile device and mapping a first reference signal pattern and a second reference signal pattern in turn to second contiguously allocated PRBs for the first mobile device.

29. The communication device of claim 25 further comprising:
   means for switching a first reference signal pattern of a first PRB with a second reference signal pattern of a second PRB when a third reference signal pattern of a third PRB is the same as the first reference signal pattern of the first PRB and a fourth reference signal pattern of a fourth PRB is the same as the second reference signal pattern of the second PRB.

30. The communication device of claim 25 further comprising: means for switching at least one first reference signal pattern in a first PRB group with at least one second reference signal pattern in the first PRB group when all reference signal patterns in the first PRB group is arranged identically the same as the ones in a second PRB group, wherein the plurality of PRBs comprises PRBs of the first PRB group and PRB of the second PRB group.

31. The communication device of claim 19, wherein the OCC mapping rule comprises cyclically mapping the plurality of reference signal patters to each PRB group of each mobile device in an order of the index numbers when the OCC mapping rule is UE-specific.

32. The communication device of claim 31 further comprising:
   means for mapping a first reference signal pattern to odd PRBs of a first PRB group and a second reference signal pattern to even PRBs of the first PRB group, wherein the odd PRBs of the first PRB group are assigned odd index numbers, the even PRBs of the first PRB group are assigned even index numbers; and
   means for mapping the first reference signal pattern to odd PRBs of a second PRB group and the second reference signal pattern to even PRBs of the second PRB group, wherein the odd PRBs of the second PRB group are assigned odd index number, the even PRBs of the second PRB group are assigned even index number;
   wherein, the plurality of PRB groups comprise the first PRB group and the second PRB group.

33. The communication device of claim 31 further comprising:
   means for mapping a first reference signal pattern to odd PRBs of a first PRB group and a second reference signal pattern to even PRBs of the first PRB group except for unused PRBs of the first PRB group, wherein the odd PRBs of the first PRB group are assigned odd index numbers, the even PRBs of the first PRB group are assigned even index numbers; and
   means for mapping the first reference signal pattern to odd PRBs of a second PRB group and the second reference signal pattern to even PRBs of the second PRB group except for unused PRBs of the second PRB group, wherein the odd PRBs of the second PRB group are assigned odd index number, the even PRBs of the second PRB group are assigned even index number;
   Wherein, the plurality of PRB groups comprise the first PRB group and the second PRB group.

34. The communication device of claim 19, wherein the plurality of PRBs are all used or partially used.

35. The communication device of claim 19 further comprising means for bundling the plurality of PRBs into a plurality of PRB groups.

36. The communication device of claim 35, wherein means for mapping the plurality of resource signal patterns to the PRBs according to the OCC mapping rule maps at least one of the plurality of reference signal patterns to each PRB group.

37. A method for reference signal pattern allocation for a mobile device in a wireless communication system, the method comprising:
receiving a plurality of physical resource blocks (PRBs) to from a eNodeB; and
using a plurality of reference signal patterns same as a plurality of OCC reference signal patterns multiplied with the associated DM RS signal on the received PRBs according to an OCC mapping rule, wherein the reference signal pattern is the demodulation reference signals on 7 OFDM symbols in time domain and 12 subcarriers in frequency domain multiplied by length-2 or length-4 Walsh code OCC mapping according to antenna port and the direction of length-2 or length-4 Walsh code OCC sequences are mapped reverse, forward and reverse on 14 OFDM symbols in time domain and 12subcarriers in frequency domain.

38. The method of claim 37, wherein the OCC reference signal pattern applies length-2 or length-4 Walsh code OCC mapping according to antenna port and the direction of length-2 or length-4 Walsh code OCC sequences are mapped forward, reverse and forward on 14 OFDM symbols in time domain and 12subcarriers in frequency domain.

39. The method of claim 38, wherein the demodulation reference signal is generated by a length-31 Gold sequence according to the index of the allocated resource block and initial value.

40. The method of claim 37, wherein the demodulation reference signal is generated by a length-31 Gold sequence according to the index of the allocated resource block and initial value.

41. The method of claim 37, wherein the OCC mapping rule comprises mapping the plurality of reference signal patters to the plurality PRBs according to a plurality of index numbers of the plurality of PRBs when the OCC mapping rule is cell-specific.

42. The method of claim 41 further comprising mapping a first reference signal pattern to odd PRBs of the plurality of PRBs and a second signal pattern to even PRBs of the plurality of PRBS, wherein the odd PRBs are assigned odd index number, the even PRBs are assigned even index number.

43. The method of claim 37, wherein the OCC mapping rule comprises cyclically mapping the plurality of reference signal patters to all PRBs of each mobile device in an order of the index numbers when the OCC mapping rule is UE-specific.

44. The method of claim 43 further comprising:
mapping a first reference signal pattern and a second reference signal pattern in turn to allocated PRBs for the first mobile device.

45. The method of claim 43 further comprising:
mapping a first reference signal pattern and a second reference signal pattern in turn to first contiguously allocated PRBs for the first mobile device and mapping a second reference signal pattern and a first reference signal pattern in turn to second contiguously allocated PRBs for the first mobile device.

46. The method of claim 43 further comprising:
mapping a first reference signal pattern and a second reference signal pattern in turn to first contiguously allocated PRBs for the first mobile device and mapping a first reference signal pattern and a second reference signal pattern in turn to second contiguously allocated PRBs for the first mobile device.

47. The method of claim 43 further comprising: switching a first reference signal pattern of a first PRB with a second reference signal pattern of a second PRB when a third reference signal pattern of a third PRB is the same as the first reference signal pattern of the first PRB and a fourth reference signal pattern of a fourth PRB is the same as the second reference signal pattern of the second PRB.

48. The method of claim 43 further comprising: switching at least one first reference signal pattern in a first PRB group with at least one second reference signal pattern in the first PRB group when all reference signal patterns in the first PRB group is arranged identically the same as the ones in a second PRB group, wherein the plurality of PRBs comprises PRBs of the first PRB group and PRB of the second PRB group.

49. The method of claim 37, wherein the OCC mapping rule comprises cyclically mapping the plurality of reference signal patters to each PRB group of each mobile device in an order of the index numbers when the OCC mapping rule is UE-specific.

50. The method of claim 49 further comprising:
mapping a first reference signal pattern to odd PRBs of a first PRB group and a second reference signal pattern to even PRBs of the first PRB group, wherein the odd PRBs of the first PRB group are assigned odd index numbers, the even PRBs of the first PRB group are assigned even index numbers; and
mapping the first reference signal pattern to odd PRBs of a second PRB group and the second reference signal pattern to even PRBs of the second PRB group, wherein the odd PRBs of the second PRB group are assigned odd index number, the even PRBs of the second PRB group are assigned even index number;
wherein, the plurality of PRB groups comprise the first PRB group and the second PRB group.

51. The method of claim 49 further comprising:
mapping a first reference signal pattern to odd PRBs of a first PRB group and a second reference signal pattern to even PRBs of the first PRB group except for unused PRBs of the first PRB group, wherein the odd PRBs of the first PRB group are assigned odd index numbers, the even PRBs of the first PRB group are assigned even index numbers; and
mapping the first reference signal pattern to odd PRBs of a second PRB group and the second reference signal pattern to even PRBs of the second PRB group except for unused PRBs of the second PRB group, wherein the odd PRBs of the second PRB group are assigned odd index number, the even PRBs of the second PRB group are assigned even index number;
Wherein, the plurality of PRB groups comprise the first PRB group and the second PRB group.

52. The method of claim 37, wherein the plurality of PRBs are all used or partially used.

53. The method of claim 37, wherein the plurality of PRBs is buddle into a plurality of PRB groups.

54. The method of claim 53, wherein the OCC mapping rule comprises mapping at least one of the plurality of reference signal patterns to each PRB group.

55. A communication device for reference signal pattern allocation for a mobile device in a wireless communication system, the communication device comprising:
means for receiving a plurality of physical resource blocks (PRBs) to from a eNodeB; and
means for using a plurality of reference signal patterns same as a plurality of OCC reference signal patterns multiplied with the associated DM RS signal to demodulate the PRBs according to an OCC mapping rule, wherein the reference signal pattern is the demodulation reference signals on 7 OFDM symbols in time domain and 12 subcarriers in frequency domain multiplied by length-2 or length-4 Walsh code OCC mapping according to antenna port and the direction of length-2 or length-4 Walsh code OCC sequences are mapped reverse, forward and reverse on 14 OFDM symbols in time domain and 12 subcarriers in frequency domain.

56. The communication device of claim 55, wherein the OCC reference signal pattern applies length-2 or length-4 Walsh code OCC mapping according to antenna port and the direction of length-2 or length-4 Walsh code OCC sequences are mapped forward, reverse and forward on 14 OFDM symbols in time domain and 12 subcarriers in frequency domain.

57. The communication device of claim 56, wherein the demodulation reference signal is generated by a length-31 Gold sequence according to the index of the allocated resource block and initial value.

58. The communication device of claim 55, wherein the demodulations reference signal is generated by a length-31 Gold sequence according to the index of the allocated resource block and the initial value.

59. The communication device of claim 55, wherein the OCC mapping rule comprises mapping the plurality of reference signal patters to the plurality PRBs according to a plurality of index numbers of the plurality of PRBs when the OCC mapping rule is cell-specific.

60. The communication device of claim 59 further comprising means for mapping a first reference signal pattern to odd PRBs of the plurality of PRBs and a second signal pattern to even PRBs of the plurality of PRBS, wherein the odd PRBs are assigned odd index number, the even PRBs are assigned even index number.

61. The communication device of claim 55, wherein the OCC mapping rule comprises cyclically mapping the plurality of reference signal patters to all PRBs of each mobile device in an order of the index numbers when the OCC mapping rule is UE-specific.

62. The communication device of claim 61 further comprising:
means for mapping a first reference signal pattern and a second reference signal pattern in turn to allocated PRBs for the first mobile device.

63. The communication device of claim 61 further comprising:
means for mapping a first reference signal pattern and a second reference signal pattern in turn to first contiguously allocated PRBs for the first mobile device and mapping a second reference signal pattern and a first reference signal pattern in turn to second contiguously allocated PRBs for the first mobile device.

64. The communication device of claim 61 further comprising:
means for mapping a first reference signal pattern and a second reference signal pattern in turn to first contiguously allocated PRBs for the first mobile device and mapping a first reference signal pattern and a second reference signal pattern in turn to second contiguously allocated PRBs for the first mobile device.

65. The communication device of claim 61 further comprising: means for switching a first reference signal pattern of a first PRB with a second reference signal pattern of a second PRB when a third reference signal pattern of a third PRB is the same as the first reference signal pattern of the first PRB and a fourth reference signal pattern of a fourth PRB is the same as the second reference signal pattern of the second PRB.

66. The communication device of claim 61 further comprising: means for switching at least one first reference signal pattern in a first PRB group with at least one second reference signal pattern in the first PRB group when all reference signal patterns in the first PRB group is arranged identically the same as the ones in a second PRB group, wherein the plurality of PRBs comprises PRBs of the first PRB group and PRB of the second PRB group.

67. The communication device of claim 55, wherein the OCC mapping rule comprises cyclically mapping the plurality of reference signal patters to each PRB group of each mobile device in an order of the index numbers when the OCC mapping rule is UE-specific.

68. The communication device of claim 67 further comprising:
means for mapping a first reference signal pattern to odd PRBs of a first PRB group and a second reference signal pattern to even PRBs of the first PRB group, wherein the odd PRBs of the first PRB group are assigned odd index numbers, the even PRBs of the first PRB group are assigned even index numbers; and
means for mapping the first reference signal pattern to odd PRBs of a second PRB group and the second reference signal pattern to even PRBs of the second PRB group, wherein the odd PRBs of the second PRB group are assigned odd index number, the even PRBs of the second PRB group are assigned even index number;
Wherein, the plurality of PRB groups comprise the first PRB group and the second PRB group.

69. The communication device of claim 67 further comprising:
means for mapping a first reference signal pattern to odd PRBs of a first PRB group and a second reference signal pattern to even PRBs of the first PRB group except for unused PRBs of the first PRB group, wherein the odd PRBs of the first PRB group are assigned odd index numbers, the even PRBs of the first PRB group are assigned even index numbers; and
means for mapping the first reference signal pattern to odd PRBs of a second PRB group and the second reference signal pattern to even PRBs of the second PRB group except for unused PRBs of the second PRB group,
wherein the odd PRBs of the second PRB group are assigned odd index number, the even PRBs of the second PRB group are assigned even index number;
Wherein, the plurality of PRB groups comprise the first PRB group and the second PRB group.

70. The communication device of claim 55, wherein the plurality of PRBs are all used or partially used.

71. The communication device of claim 55, wherein the plurality of PRBs is buddle into a plurality of PRB groups.

72. The communication device of claim 61, wherein the OCC mapping rule comprises mapping at least one of the plurality of reference signal patterns to each PRB group.

* * * * *